United States Patent
Neuschwander et al.

(10) Patent No.: US 11,242,237 B2
(45) Date of Patent: Feb. 8, 2022

(54) TAMPERING DETECTION SYSTEM FOR A NOZZLE AND METHOD FOR DETECTING NOZZLE TAMPERING

(71) Applicant: Pilz GmbH & Co. KG, Ostfildern (DE)

(72) Inventors: Bernd Neuschwander, Ostfildern (DE); Onedin Ibrocevic, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 16/917,218

(22) Filed: Jun. 30, 2020

(65) Prior Publication Data
US 2021/0017012 A1 Jan. 21, 2021

(30) Foreign Application Priority Data
Jul. 17, 2019 (DE) .......................... 102019119414.8

(51) Int. Cl.
| | |
|---|---|
| *B67D 3/00* | (2006.01) |
| *G01L 1/20* | (2006.01) |
| *G01L 1/18* | (2006.01) |
| *G01L 5/10* | (2020.01) |
| *D03D 1/00* | (2006.01) |
| *B32B 5/02* | (2006.01) |
| *B32B 7/025* | (2019.01) |

(52) U.S. Cl.
CPC ............ *B67D 3/0074* (2013.01); *B32B 5/024* (2013.01); *B32B 7/025* (2019.01); *B67D 3/0077* (2013.01); *D03D 1/0088* (2013.01); *G01L 1/18* (2013.01); *G01L 1/205* (2013.01); *G01L 5/10* (2013.01); *D10B 2401/18* (2013.01); *D10B 2403/02431* (2013.01)

(58) Field of Classification Search
CPC .................................. B67D 3/00; B32B 7/025
See application file for complete search history.

(56) References Cited

U.S. PATENT DOCUMENTS

| | | | |
|---|---|---|---|
| 2004/0020938 A1* | 2/2004 | Boillat | G01N 35/10 222/61 |
| 2005/0006403 A1* | 1/2005 | Prineppi | F04B 49/02 222/64 |
| 2020/0110056 A1* | 4/2020 | Chen | G01N 1/2273 |

FOREIGN PATENT DOCUMENTS

| | | |
|---|---|---|
| DE | 102011111483 A1 | 2/2013 |
| EP | 3399292 A1 | 11/2018 |

OTHER PUBLICATIONS

Search Report in corresponding European Patent Application No. 20175340.7, dated Nov. 17, 2020, with English translation.

* cited by examiner

*Primary Examiner* — Andrew T Piziali
(74) *Attorney, Agent, or Firm* — Edell, Shapiro & Finnan, LLC

(57) ABSTRACT

A tampering detection system for a dispensing nozzle of a dispensing system in which the dispensing nozzle is inserted into a connecting piece of the dispensing system comprises a flat, tactile sensor comprising at least two pressure sensitive and individually evaluable sensor segments. The sensor is arranged between the connecting piece and the dispensing nozzle and extends along an inner circumference of the connecting piece in a connecting region for the dispensing nozzle. The tamper detection system further comprises an evaluation unit connected to the sensor segments to detect a pressure acting on each of the sensor segments.

10 Claims, 2 Drawing Sheets

TAMPERING DETECTION SYSTEM FOR A NOZZLE AND METHOD FOR DETECTING NOZZLE TAMPERING

CROSS REFERENCE TO RELATED APPLICATIONS

This application claims foreign priority under 35 U.S.C. § 119(a)-(d) to Application No. DE 102019119414.8 filed on Jul. 17, 2019, the entire contents of which are hereby incorporated by reference.

TECHNICAL FIELD

Disclosed is a tampering detection system for a dispensing nozzle of a dispensing system, wherein the dispensing nozzle is inserted into a connecting piece of the dispensing system. A method for detecting tampering with a dispensing nozzle of a dispensing system is also disclosed.

BACKGROUND

Dispensing systems by which, for example, pourable food can be filled into packagings or other containers, comprise at least one dispensing nozzle that is inserted into a connecting piece that is provided on the system side. During the dispensing process, the food flows out of the dispensing nozzle into the packagings or the other containers. In this context, it is important from the perspective of food safety for the dispensing nozzle to be positioned correctly inside the connecting piece and, in particular, not to have been subsequently tampered with.

SUMMARY

An object is to provide a tampering detection system for a dispensing nozzle of a dispensing system as well as a method for detecting a tampering with a dispensing nozzle of a dispensing system such that any tampering with the dispensing nozzle can be reliably detected by the tampering detection system in an easy and cost effective way.

An inventive tampering detection system for a dispensing nozzle of a dispensing system, wherein the dispensing nozzle is inserted into a connecting piece of the dispensing system, comprises a flat, tactile sensor that has a number $n \geq 2$ of pressure sensitive and individually evaluable sensor segments and that extends along an inner circumference of the connecting piece in a connecting region for the dispensing nozzle and that is arranged between the connecting piece and the dispensing nozzle, as well as an evaluation unit, which is connected to the sensor segments and is designed to detect for each of the sensor segments a pressure acting on the respective sensor segment. The disclosed tampering detection system can be used to detect any subsequent tampering with the dispensing nozzle, in particular, the attempt to loosen the dispensing nozzle from the connecting piece of the dispensing system in a very simple way, in particular, also in an automated manner. The tactile sensor can have preferably four sensor segments that can be made, in particular, the same size, so that in the case of a dispensing nozzle with a circular cross section each of the four sensor segments covers an angular range of 90°. The tactile sensor can be attached to the inner face of the connecting piece in a number of different ways. For example, it is possible for the tactile sensor to be glued to the inner face of the connecting piece in the connecting region for the dispensing nozzle. As an alternative, it is also possible to provide, for example, a clamping ring that is inserted into the connecting piece during assembly and is designed to fix the tactile sensor in its desired mounting position in a clamping manner on the inner face of the connecting piece before the dispensing nozzle is mounted at a later time.

In principle, a combination of an adhesive connection with a clamping connection, which can be implemented, in particular, by the clamping ring, is also possible. The dispensing nozzle is inserted into the receiving opening of the connecting piece and, when correctly mounted, exerts a relatively uniform pressure on all of the sensor segments of the tactile sensor, especially if the connecting piece and the dispensing nozzle have a circular cross section. If then the evaluation unit detects in essence the same level of pressure for each of the sensor segments, then the dispensing nozzle is correctly mounted and is in its desired mounting position. In this case, the tightness of the arrangement is ensured by the dispensing nozzle itself that is mounted so as to fit precisely inside the connecting piece. If the dispensing nozzle were to be subsequently tampered with and were no longer in its desired mounting position, then at least one of the sensor segments will detect a pressure that has changed significantly with respect to the correctly mounted state of the dispensing nozzle. The pressure change is evaluated by the evaluation unit and converted by the evaluation unit preferably into a corresponding response measure. Possible response measures to this event may be, for example, the automated shutting down of the dispensing system and/or the output of a warning message or, more specifically, a warning signal.

The tactile sensor in one advantageous embodiment comprises a first layer and a second layer, with the two layers being provided with electrically conductive electrodes that are spaced apart from one another by a compressible, pressure sensitive intermediate layer, so that the compression of the intermediate layer causes a change in the electrical property between the electrodes that is detectable by the evaluation unit. The intermediate layer is designed such that it is compressed by the action of a compressive force that is generated by the dispensing nozzle inserted into the connecting piece. This compression causes a change in the electrical property between the electrodes that is detectable by the evaluation unit; and the changed property is a measure for the amount of pressure that is exerted on the individual sensor segments. The intermediate layer may include, for example, compressible elements, so that when subjected to a level of pressure that exceeds a defined limit value that is specified by the elasticity properties of the intermediate layer, the electrodes of the two layers are pressed against each other; and, as a result, this may lead to a direct contact between the electrodes. When the dispensing nozzle is correctly mounted, the electrodes are pressed against each other preferably in all of the sensor segments, so that the electrodes are in contact with each other in all of the sensor segments. If the pressure, acting on at least one of the sensor segments, is reduced by at least partially loosening the dispensing nozzle from the connecting piece such that the limit value, required for the electrodes of the sensor segment concerned to be pressed against each other, is undershot, then the electrodes are no longer in contact with each other in the sensor segment concerned. This state can be detected accordingly by the evaluation unit.

In an alternative embodiment, the intermediate layer can also be made from a material that changes its electrical resistance when subjected to compressive loading. Such an intermediate layer can be formed, for example, over the entire surface. Consequently even if the electrodes of the two layers do not make direct contact with each other, this change in resistance can be detected by the evaluation unit that is designed accordingly. By suitably calibrating and assigning the measured electrical resistance values to the pressure values, the pressure in each of the sensor segments can be determined in a relatively accurate way in this embodiment.

The layers that are provided with the electrodes may be designed preferably as a two-dimensional structure, in particular, as a two-dimensional textile structure with electrodes that are made of electrically conductive yarns and are sewn or woven into the two-dimensional textile structure. Such two-dimensional structures, in particular, two-dimensional textile structures, are characterized by a high flexibility, so that the tactile sensor, which is formed by the two layers and the intermediate layer that is disposed between the two layers, can be adapted very easily to the shape of the connecting piece or, more specifically, the dispensing nozzle and, in addition, can also be easily mounted.

In a preferred embodiment, it is proposed that the first layer of the tactile sensor is provided with at least one electrically conductive electrode that extends through all of the sensor segments. Thus, all of the sensor segments in the first layer comprise at least one common electrode, optionally also a plurality of common electrodes.

In a particularly preferred embodiment, there is the option that the second layer of the tactile sensor has a number of electrodes that corresponds to the number of sensor segments or to a multiple of the number of sensor segments. The electrodes of the second layer of the tactile sensor extend preferably orthogonal to the at least one electrode of the first layer, where the at least one electrode is common to all of the sensor segments, so that a matrix-like structure of the sensor segments of the tactile sensor can be obtained; and the matrix-like structure can be evaluated in a relatively easy way by the evaluation unit. In this context, it has been found to be useful in practice for the number of electrodes in the second layer to be identical in each of the sensor segments.

In one advantageous embodiment it can be provided that a pressure reference value, which represents the pressure that is exerted on the respective sensor segments when the dispensing nozzle has been correctly mounted in the connecting piece, is defined for each of the sensor segments in the evaluation unit. This has the background that in the case of certain types and geometric designs of the dispensing nozzle and the connecting piece, such as, for example, in the case of cross-sectional shapes that are longitudinally elliptical and deviate from a circular shape, the pressure values, measured by the sensor segments, may differ from the start. In other words, the pressure values, which are measured in the individual sensor segments, may differ from each other, even though the dispensing nozzle has been correctly mounted inside the connecting piece. However, the pressure reference values may also be identical or rather more or less identical for each of the sensor segments.

In a particularly advantageous embodiment, it may be provided that a tolerance range is defined for each of the pressure reference values of the sensor segments in the evaluation unit. This tolerance range indicates the pressure, up to which the dispensing nozzle may still be considered to be correctly mounted.

An inventive method for detecting a tampering with a dispensing nozzle of a dispensing system, wherein the dispensing nozzle is inserted into a connecting piece of the dispensing system, comprises the steps of:

providing a flat, tactile sensor with a number n≥2 of pressure sensitive and individually evaluable sensor segments, where the sensor is positioned in a connecting region for the dispensing nozzle between the connecting piece and the dispensing nozzle such that the sensor extends along an inner circumference of the connecting piece and is subjected to a pressure by the dispensing nozzle that is inserted into the connecting piece, detecting the pressure, exerted on each of the sensor segments, by an evaluation unit that is connected to the tactile sensor, and checking whether the measured pressure values indicate a tampering with the dispensing nozzle.

The disclosed method makes it possible to check in an easy way whether the dispensing nozzle, which has been inserted into the connecting piece of the dispensing system, may have been perhaps tampered with later on. If the dispensing nozzle has been subsequently tampered with and at least partially loosened, for example, with the use of a screwdriver, then at least one of the sensor segments will detect a pressure, which has changed significantly with respect to the correctly mounted state of the dispensing nozzle; and this pressure change is evaluated by the evaluation unit and is converted into a corresponding response measure. Possible response measures to this event may be, for example, the shutting down of the dispensing system and/or the output of a warning message or, more specifically, a warning signal.

In a preferred embodiment, it is proposed that a pressure reference value, which represents the pressure that is exerted on the respective sensor segments when the dispensing nozzle has been correctly mounted in the connecting piece, is defined for each of the sensor segments in the evaluation unit.

In a particularly preferred embodiment, it can be provided that a tolerance range is defined for each of the pressure reference values of the sensor segments in the evaluation unit. This tolerance range indicates such pressure values, at which the dispensing nozzle may still be considered to be correctly mounted. If the measured pressure of at least one of the sensor segments is outside the tolerance range defined for the sensor segment concerned, then this indicates, in particular, a subsequent tampering with the dispensing nozzle, so that the evaluation unit can initiate the corresponding response measures.

BRIEF DESCRIPTION OF THE DRAWINGS

Other features and advantages of the disclosed system and method will become apparent from the following description of an example embodiment with reference to the accompanying drawings, which show in.

DETAILED DESCRIPTION

Figure 1:
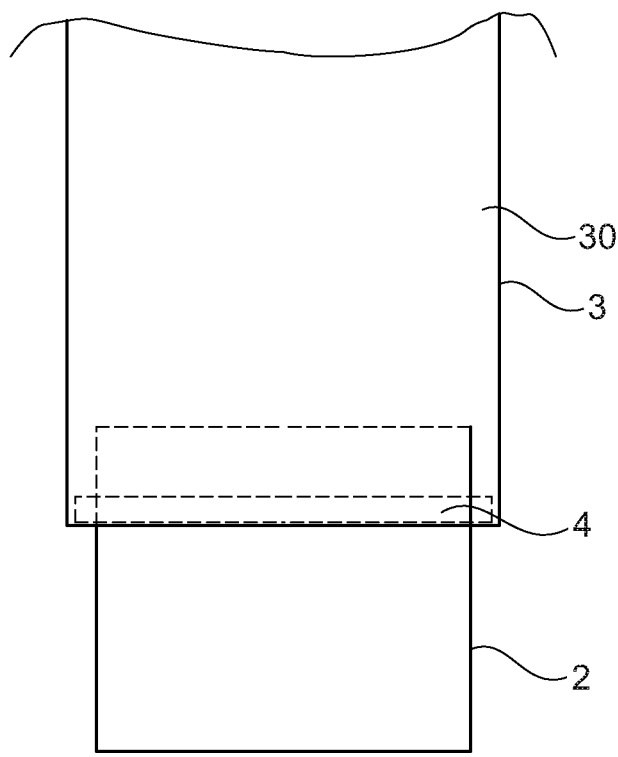
FIG. 1 is a side view of a part of a connecting piece of a dispensing system with a dispensing nozzle that is received in the connecting piece.

FIG. 1 shows a side view of a part of a connecting piece 3 of a dispensing system, which otherwise is not depicted in more detail, with a dispensing nozzle 2 received in the connecting piece. The dispensing system can be used to package, for example, pourable food that can be filled into the corresponding packagings by the dispensing nozzle. In this context it is important, in particular, from the aspect of food safety for the dispensing nozzle 2 to be positioned correctly inside the connecting piece 3 and, for example, not to have been subsequently tampered with.

A tampering detection system 1 is presented below with further reference to FIGS. 2 to 4; the tampering detection system is designed in accordance with an example embodiment of and is used to check in a simple way whether the dispensing nozzle 2 has been subsequently tampered with.

Figure 2:
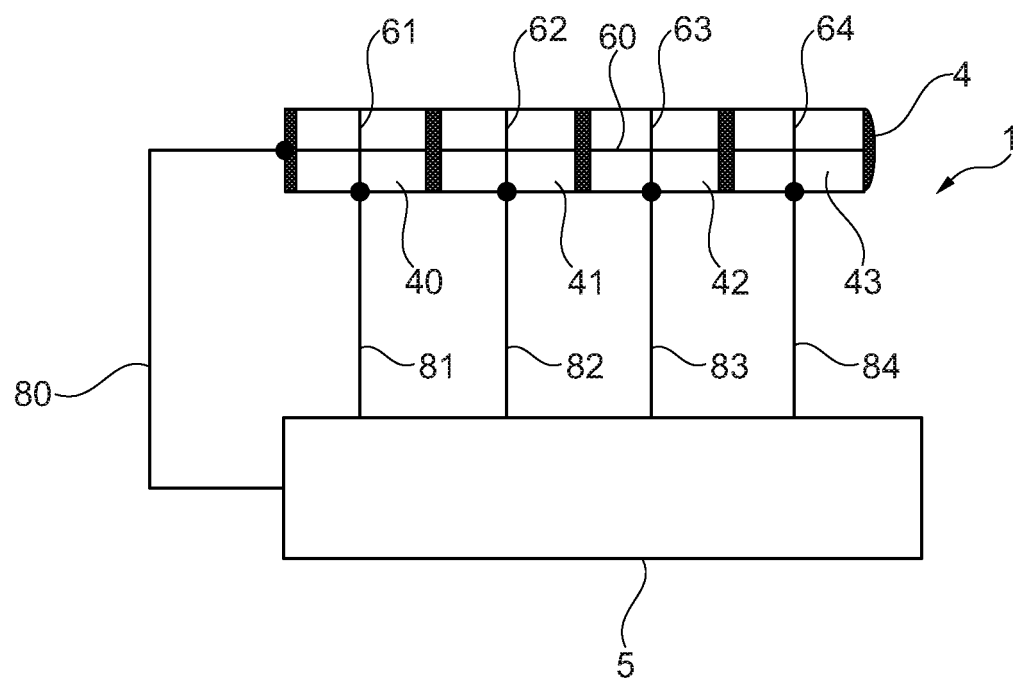
FIG. 2 is in schematic form a highly simplified representation of a tampering detection system for a dispensing nozzle of a dispensing system, where the tampering detection system is designed in accordance with an example embodiment.

As can be seen in FIG. 2, the tampering detection system 1 comprises a flat, tactile sensor 4, which during assembly is arranged between the connecting piece 3 and the dispensing nozzle 2 in a connecting region for the dispensing nozzle 2, and an evaluation unit 5, which is connected to the tactile sensor 4 and which is designed to process and evaluate the measurement signals of the tactile sensor 4.

The tactile sensor 4 is constructed in multiple layers and has in this example embodiment n=4 tactile sensor segments 40, 41, 42, 43 that can measure the pressure values and that can be evaluated individually by the evaluation unit 5. The tactile sensor segments 40, 41, 42, 43 are pressure sensitive, so that they can respond to external mechanical loads. Due to the fact that n=4 tactile sensor segments 40, 41, 42, 43 are provided, pressure measurements can be performed, during which location information can be obtained at the same time, because the evaluation unit 5 can be used to determine which one of the sensor segments 40, 41, 42, 43 has acquired a specific pressure value. The four sensor segments 40, 41, 42, 43 in this example embodiment are designed to be the same size, so that in the case of a dispensing nozzle 2 with a circular cross section, each of the four sensor segments 40, 41, 42, 43 covers a respective angular range (measurement range) of 90°.

Figure 3:
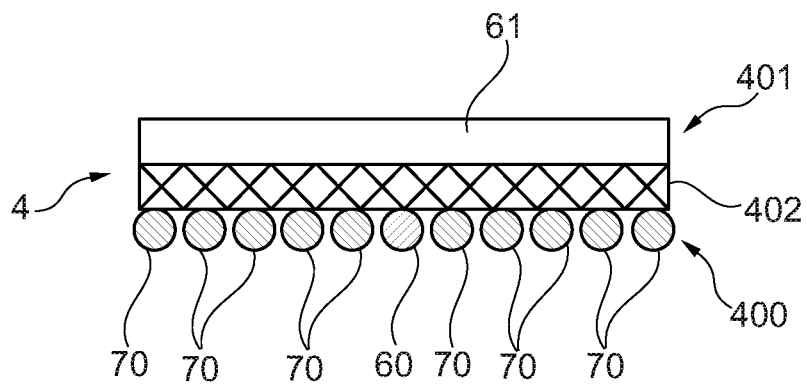
FIG. 3 is a tactile sensor of the tampering detection system in a cross-sectional view.

As can be seen in FIG. 3, the tactile sensor 4 is made in multiple layers and comprises at least one first layer 400, at least one second layer 401 as well as a pressure sensitive intermediate layer 402, by which the first layer 400 and the second layer 401 are spaced apart from each other. The first layer 400 and the second layer 401 are designed as a two-dimensional textile structure and, as a result, are designed to be correspondingly flexible.

The first layer 400 comprises at least one electrically conductive electrode 60 that extends in the longitudinal direction L through all four of the sensor segments 40, 41, 42, 43 and, as a result, forms an electrode 60 that is common to all of the four sensor segments 40, 41, 42, 43. In the second layer 401 a total of four electrodes 61, 62, 63, 64 are formed that extend in the longitudinal direction in parallel to each other and are spaced apart from one another. Each of the four sensor segments 40, 41, 42, 43 comprises the electrode 60 of first layer 400, where the electrode is common to all of the sensor segments 40, 41, 42, 43, and in each case one of the four electrodes 61, 62, 63, 64 of the second layer 401. The electrode 60 of the first layer 400 and the electrodes 61, 62, 63, 64 of the second layer 401 are arranged similar to a matrix, so that they form the four sensor segments 40, 41, 42, 43, which can be evaluated separately, and form preferably an angle with each other of 90°. In principle, however, other angles between the electrode 60 of the first layer 400 and the electrodes 61, 62, 63, 64 of the second layer 401 are also possible.

The electrodes 60, 61, 62, 63, 64 are made preferably of an electrically conductive yarn. Such an electrically conductive yarn is generally a linear textile structure that can be processed into woven fabric, crocheted fabric, knitted fabric and embroideries and can also be used, in particular, for sewing. Compared to a conventional, electrically non-conductive yarn, a conductive yarn is designed to conduct electric current. This objective can be achieved, for example, by spinning the yarn from conductive fibers, for example, using stainless steel fibers. As an alternative, however, a conventional, electrically non-conducting fiber can also be made conductive by coating the electrically non-conducting fiber with an electrically conductive material. The electrodes 60, 61, 62, 63, 64 are formed preferably by a thread of an electrically conductive yarn, so that they are designed to be correspondingly flexible. It goes without saying that the electrodes 60, 61, 62, 63, 64 in the other example embodiments, which are not depicted explicitly here, can also be made from a plurality of electrically conductive threads.

The first layer 400 and the second layer 401 comprise, in addition to the electrodes 60, 61, 62, 63, 64, other electrically non-conducting threads 70 that extend parallel to the electrodes 60, 61, 62, 63, 64 and are connected to each other, in particular, interwoven with one another, by threads (that are not shown explicitly here) that extend at right angles to the other electrically non-conducting threads, in order to form in this way the two-dimensional textile structure. The electrically non-conducting threads of the second layer 401 cannot be seen in the illustration shown in FIG. 2, since in the illustration they are covered by the electrode 61. The electrodes 60, 61, 62, 63, 64 are connected directly or, as in the example embodiment shown here, indirectly, in particular, with the aid of additional electrical connecting cables 80, 81, 82, 83, 84, to the evaluation unit 5, by which the pressure, prevailing in the individual sensor segments 40, 41, 42, 43, can be evaluated individually.

Thus, the tactile sensor 4 comprises two layers 400, 401, which are provided with the electrically conductive electrodes 60, 61, 62, 63, 64 and are designed as a two-dimensional textile structure. The two layers are separated from each other by the pressure sensitive intermediate layer 402. The tactile sensor 4 works, as a general rule, according to the principle that an electrical property between the electrodes 60, 61, 62, 63, 64 changes as soon as a compressive force acts on the tactile sensor 4; and, as a result, the intermediate layer 402 is compressed. In this case those areas inside the sensor segments 40, 41, 42, 43, in which the electrode 60 of the first layer 400 and the electrodes 61, 62, 63, 64 of the second layer 401 overlap, form the active areas, in which a compression of the pressure sensitive material of the intermediate layer 402 can be detected. For this purpose the intermediate layer 402 can have, for example, compressible elements, so that the electrodes 60, 61, 62, 63, 64 of the two layers 400, 401 are pressed against each other, subject to the action of a compressive force with the result that there is direct contact between the electrodes 60, 61, 62, 63, 64 of the two layers 400, 401. When all of the electrodes 61, 62, 63, 64 of the second layer 401 are in electrical contact with the electrode 60 of the first layer 400, the dispensing nozzle 2 is correctly mounted inside the connecting piece 3. The dispensing nozzle 2 exerts a correspondingly large pressure on the sensor segments 40, 41, 42 43, and the large pressure causes the electrodes 60, 61, 62, 63, 64 to make the corresponding electrical contact with each other. If in the event of subsequent tampering the dispensing nozzle 2 has been loosened at least partially from the connecting piece 3, then in at least one of the sensor segments 40, 41, 42, 43 the pressure that is exerted on the one sensor segment will not be sufficient to bring the electrode 60 of the first layer 400 into electrical contact with the associated electrode 61, 62, 63, 64 of the second layer 401. This state can be detected very easily by the evaluation unit 5 for the sensor segment 40, 41, 42, 43 concerned.

In alternative embodiments there is also the option that the intermediate layer 402 is made of a material that changes its electrical resistance when subjected to a compressive force. Such an intermediate layer 402 can be formed, in particular, over the entire surface, so that even if the electrodes 60, 61, 62, 63, 64 of the two layers 400, 401 are not in direct contact with each other, these changes in resistance in the four sensor segments 40, 41, 42, 43 can be detected by the evaluation unit 5. These changes in resistance are a measure for the pressure that is exerted in each case on the sensor segments 40, 41, 42, 43. By suitably calibrating and assigning the measured electrical resistance values to the pressure values, the pressure in each of the sensor segments 40, 41, 42, 43 can be determined in a relatively accurate way.

Figure 4:
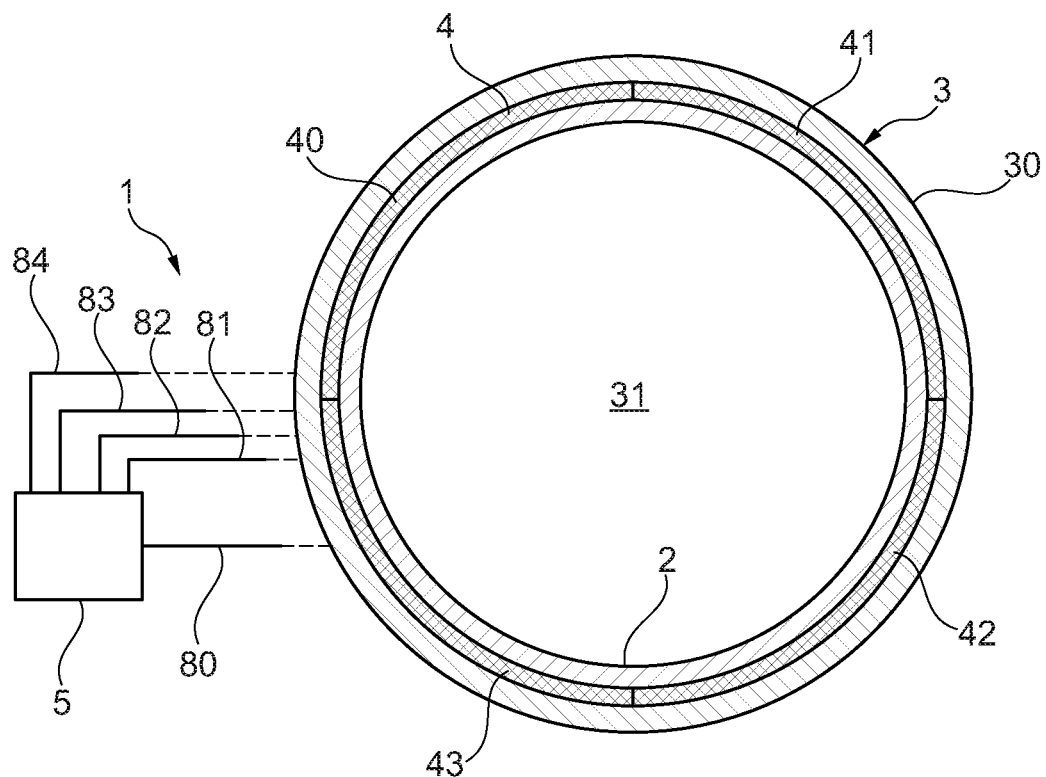
FIG. 4 is a cross-sectional view of the connecting piece with the tactile sensor of the tampering detection system, wherein the tactile sensor is disposed inside the connecting piece, and with the dispensing nozzle, received inside the connecting piece.

FIGS. 1 and 4, to which reference is made at this point, show a part of the connecting piece 3 of the dispensing system, which is not shown in greater detail here. This connecting piece 3 in this example embodiment has a hollow cylindrical shape and has a lateral surface 30 as well as a receiving opening 31, into which the dispensing nozzle 2 of the dispensing system is inserted, in a lower region.

In an area adjacent to the receiving opening 31 in the axial direction, the above described tactile sensor 4 with its four sensor segments 40, 41, 42, 43, which can be evaluated individually by the evaluation unit 5, is attached to an inner face of the connecting piece 3. The tactile sensor 4 is shown as dashed lines in FIG. 1. The term "adjacent" should not be understood in this context to imply that the tactile sensor 4 has to be necessarily directly adjacent to the receiving opening 31, but rather that it may also be disposed axially further inwards, but preferably in the vicinity of the receiving opening 31 of the connecting piece 3. The length of the tactile sensor 4 is selected such that, after mounting, the tactile sensor extends along an inner circumference of the connecting piece 3. Therefore, in the desired mounting position the tactile sensor 4 is designed so as to be closed in the shape of a circular ring.

When mounting, the tactile sensor 4 can be attached to the inner face of the connecting piece 3 in a variety of different ways. For example, it is possible for the tactile sensor 4 to be glued to the inner face of the connecting piece 3. As an alternative, it is also possible to provide, for example, a clamping ring, which is not depicted explicitly here and which is inserted into the connecting piece 3 during assembly and which is designed to fix the tactile sensor 4 in its desired mounting position in a clamping manner on the inner face of the connecting piece 3 prior to the mounting of the dispensing nozzle 2. In principle, a combination of an adhesive connection with a clamping connection, which can be implemented, in particular, by the clamping ring, is also possible. The connecting piece 3 has a borehole, which is not depicted explicitly here, in its lateral surface 30. The electrodes 60, 61, 62, 63, 64 or, more specifically, the electrical connecting cables 80, 81, 82, 83, 84, to which the electrodes 60, 61, 62, 63, 64 are connected, are passed through the borehole outwards out of the connecting piece 3, so that they can be connected to the evaluation unit 5.

After the tactile sensor 4 has been attached, the connecting piece 3 is prepared for the mounting of the dispensing nozzle 2. The dispensing nozzle 2 is inserted into the receiving opening 31 of the connecting piece 3 and, when correctly mounted, exerts a uniform pressure on all of the sensor segments 40, 41, 42, 43 of the tactile sensor 4. Therefore, in other words, all of the sensor segments 40, 41, 42, 43 are pressed by the dispensing nozzle 2 with essentially the same pressure against the inner face of the connecting piece 3. For each of the sensor segments 40, 41, 42, 43 the pressure, which is exerted on the sensor segments by the dispensing nozzle 2, can be detected by the evaluation unit 5. If the evaluation unit 5 detects in essence the same pressure for each of the sensor segments 40, 41, 42, 43, then the dispensing nozzle 2 is correctly mounted and is in its desired mounting position. In this case the tightness of the arrangement is ensured by the dispensing nozzle 2 itself that is mounted so as to fit precisely inside the connecting piece 3.

If the dispensing nozzle 2 has not been correctly mounted or has been subsequently tampered with, for example, with the use of a screwdriver, and is no longer in its desired mounting position, then at least one of the sensor segments 40, 41, 42, 43 will detect a pressure, which has changed significantly with respect to the correctly mounted state of the dispensing nozzle 2; and this pressure change is evaluated by the evaluation unit 5 and is converted into a corresponding response measure. Possible response measures to this event may be, for example, the shutting down of the dispensing system and/or the output of a warning message or, more specifically, a warning signal.

It should be stressed at this point that the pressure values, which are measured by the sensor segments 40, 41, 42, 43 when the dispensing nozzle 2 is correctly mounted inside the connecting piece 3, do not have to be exactly the same. In other geometric designs and/or arrangements, in which, for example, the connecting piece 3 and the dispensing nozzle 2 deviate from their circularly cylindrical shapes and in which the tactile sensor 4 deviates from the circular ring shape shown here, the pressure values, measured by the sensor segments 40, 41, 42, 43, may already differ significantly from each other from the start, even though the dispensing nozzle 2 has been correctly mounted.

Therefore, a pressure reference value, which represents the pressure that is exerted on the respective sensor segments 40, 41, 42, 43, when the dispensing nozzle 2 has been correctly mounted, is defined preferably for each of the sensor segments 40, 41, 42, 43. The evaluation unit 5 is taught correspondingly these pressure reference values. Furthermore, a tolerance range is defined preferably for each of the pressure reference values. This tolerance range indicates such pressure values, at which the dispensing nozzle 2 may still be considered to be correctly mounted. If the measured pressure of at least one of the sensor segments 40, 41, 42, 43 is outside the tolerance range defined for the sensor segment 40, 41, 42, 43 concerned, then this indicates, in particular, a subsequent tampering with the dispensing nozzle 2, so that the evaluation unit 5 can initiate the corresponding response measures.

The tampering detection system 1, presented here, can be used to detect subsequent tampering with at least one dispensing nozzle 2 of a dispensing system in a very simple and reliable way, in particular, also in an automated manner. For example, the evaluation unit 5 can also be configured to monitor a plurality of tactile sensors 4 in a dispensing system having a plurality of dispensing nozzles 2 that are inserted into corresponding connecting pieces 3 of the dispensing system.

What is claimed is:

1. A tampering detection system for a dispensing nozzle of a dispensing system in which the dispensing nozzle is inserted into a connecting piece of the dispensing system, the tampering detection system comprising:
   a flat, tactile sensor comprising at least two pressure sensitive and individually evaluable sensor segments, the tactile sensor being arranged between the connecting piece and the dispensing nozzle and extending along an inner circumference of the connecting piece in a connecting region for the dispensing nozzle; and
   an evaluation unit connected to the sensor segments to detect a pressure acting on each of the sensor segments.

2. The tampering detection system of claim 1, wherein the tactile sensor comprises first and second layers provided with electrically conductive electrodes and being spaced apart from one another by a pressure sensitive, compressible intermediate layer, wherein an electrical property between the electrodes of the first and second layers that is detectable by the evaluation unit changes in response to compression of the intermediate layer.

3. The tampering detection system of claim 2, wherein each of the first and second layers comprise a two-dimensional textile structure with electrodes comprising electrically conductive yarns sewn or woven into the two-dimensional textile structure.

4. The tampering detection system of claim 2, wherein the first layer of the tactile sensor includes at least one electrically conductive electrode that extends through all of the sensor segments.

5. The tampering detection system of claim 2, wherein the second layer of the tactile sensor has a number of electrodes that corresponds to the number of sensor segments or to a multiple of the number of sensor segments.

6. The tampering detection system of claim 1, wherein a pressure reference value is defined in the evaluation unit for each of the sensor segments, the pressure reference value representing a pressure exerted on respective sensor segments when the dispensing nozzle has been correctly mounted in the connecting piece.

7. The tampering detection system of claim 6, wherein a tolerance range is defined in the evaluation unit for the pressure reference value for each of the sensor segments.

8. A method for detecting tampering with a dispensing nozzle of a dispensing system in which the dispensing nozzle is inserted into a connecting piece of the dispensing system, the method comprising:
   providing a flat, tactile sensor with at least two pressure sensitive and individually evaluable sensor segments, the tactile sensor being positioned in a connecting region for the dispensing nozzle between the connecting piece and the dispensing nozzle such that the sensor extends along an inner circumference of the connecting piece and is subjected to a pressure by the dispensing nozzle, inserted into the connecting piece;
   detecting the pressure exerted on each of the sensor segments via an evaluation unit connected to the tactile sensor; and
   determining whether measured pressure values indicate a tampering with the dispensing nozzle.

9. The method of claim 8, wherein a pressure reference value is defined in the evaluation unit for each of the sensor segments, the pressure reference value representing a pressure exerted on respective sensor segments when the dispensing nozzle has been correctly mounted in the connecting piece.

10. The method of claim 9, wherein a tolerance range is defined in the evaluation unit for the pressure reference value for each of the sensor segments.

* * * * *